United States Patent [19]

Criswell

[11] 3,969,336

[45] July 13, 1976

[54] METHOD OF SEPARATING AND RECOVERING SOLUBLE PROTEINS FROM PROTEIN CONTAINING SOLUTIONS EMPLOYING FOAM FRACTIONATION

[75] Inventor: Larry Grant Criswell, Columbus, Ohio

[73] Assignee: Abbott Laboratories, North Chicago, Ill.

[22] Filed: May 22, 1974

[21] Appl. No.: 472,242

[52] U.S. Cl............................. 260/112 R; 260/122; 260/123.5
[51] Int. Cl.²........................................... A23J 1/20
[58] Field of Search................ 260/112 R, 120, 121, 260/122, 123–125

[56] References Cited
UNITED STATES PATENTS

| 1,229,919 | 6/1917 | Ebrill et al. | 260/120 |
| 2,361,057 | 10/1944 | Ratzer | 260/112 UX |
| 2,368,919 | 2/1945 | Fritzberg | 260/120 |
| 2,519,606 | 8/1950 | Sharp | 260/120 |
| 2,562,646 | 7/1951 | Sharp et al. | 260/120 |
| 2,793,185 | 5/1957 | Albrektsson et al. | 210/44 |
| 3,179,252 | 4/1965 | Vrablik | 210/44 X |
| 3,313,795 | 4/1967 | Rubin | 260/112 R |
| 3,314,880 | 4/1967 | Rubin | 260/112 R UX |
| 3,838,143 | 9/1974 | Grant | 260/112 R |

FOREIGN PATENTS OR APPLICATIONS 1,098,716  1/1968  United Kingdom

OTHER PUBLICATIONS

Chem. Abstracts, vol. 64, 1966, 7286d–e, Purac.
Chem. Abstracts, vol. 65, 1966, 1953b, Purac.

*Primary Examiner*—Howard E. Schain
*Attorney, Agent, or Firm*—Robert L. Niblack; Gildo E. Fato; Neil E. Hamilton

[57] ABSTRACT

Disclosed is a method for separating and recovering soluble proteins from protein containing solutions employing foam fractionation. In the method, air is introduced as small bubbles into a pool of protein containing solution retained within a vessel, to develop a layer of foam above the liquid. The foam produced is confined within the vessel allowing the liquid to drain therefrom, the foam issuing from the vessel containing a higher concentration of protein than the original solution. The collected foam can be broken and rerun through additional stages of foaming to further concentrate the protein or process for recovery of the protein.

5 Claims, 7 Drawing Figures

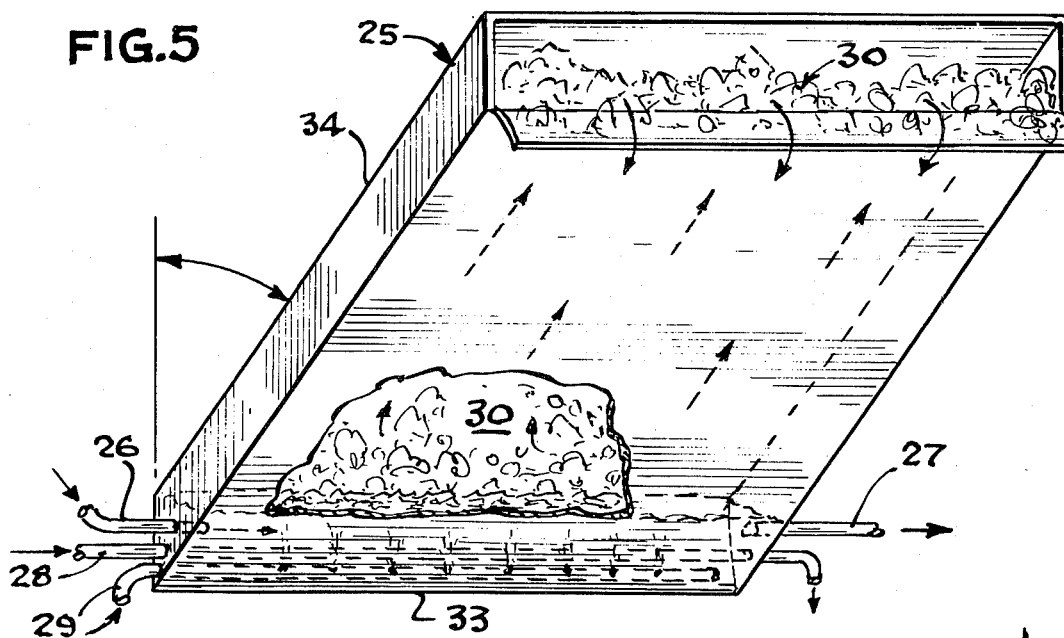
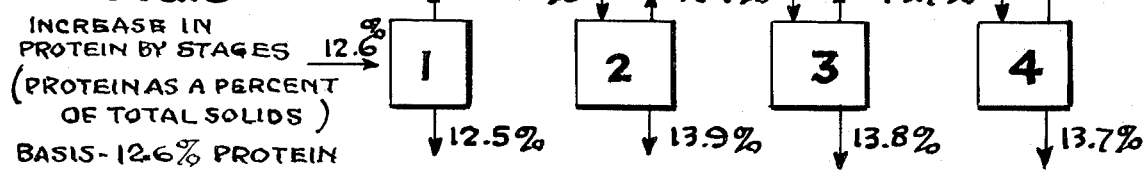
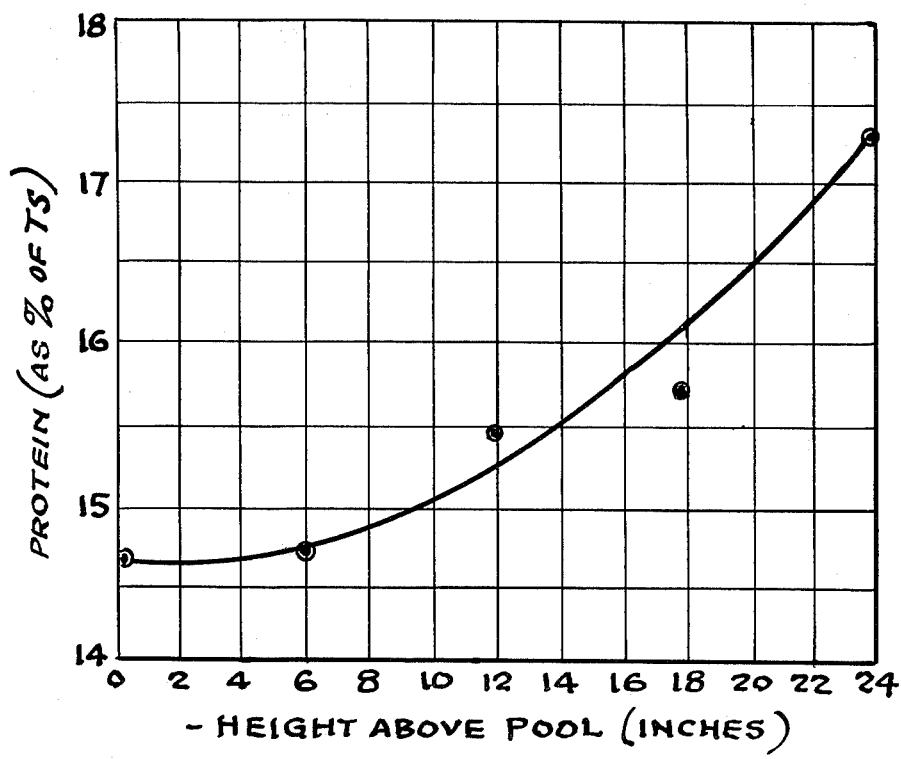

METHOD OF SEPARATING AND RECOVERING SOLUBLE PROTEINS FROM PROTEIN CONTAINING SOLUTIONS EMPLOYING FOAM FRACTIONATION

BACKGROUND OF THE INVENTION

Approximately 30 billion pounds of cheese whey is produced every year. Of this amount, about one-third is utilized as human or animal feed in some form. The remaining whey is both a serious pollution problem, and at the same time a challenge for profitable utilization. Present processing of whey includes simple drying of the whey to a powder containing all of the original solids, the use of reverse osmosis, ultra filtration, gel fractionation, and electrodialysis, which result in varying degrees of fractionation and purification of the whey protein. While the raw material is cheap, these processes add substantially to the cost, generally resulting in a price that is not attractive or competitive with a conventional source of protein. Existing methods appear to be attractive only for: 1 large operations where the whey is available on sight, (2) captive use of the finished product, or (3) preparation of special, or high purity products for which a known market exists. It is known that transportation costs are generally limiting for raw whey and that the use of conventional concentration equipment, for the purpose of reducing the weight to be hauled, is not economically feasible for the small dairy operation.

Various processes have been developed for the separation of protein from whey. U.S. Pat. No. 2,519,606 discloses a process of recovering protein from aqueous liquid material containing protein in coagulable form. A gas is injected into the liquid to form a foam, the bubbles of which carry up adherant coagulated protein particles. The protein isolated in this manner is therefore separated by gravity. U.S. Pat. No. 3,252,961 issued May 24, 1966 discloses a process for separating whey proteins involving the flocculation of the proteins as an easily separable curd after denaturation by heat and precipitation under specified conditions. This flocculation method employs special flocculating agents. The curd which forms and comprising the flocculated protein is then separated from the liquid and collected by any suitable method. Both methods disclosed in these patents however, are concerned with the separation of insoluble proteins and are similar consequently, to ore froth flotation wherein the insoluble particles are carried off by a foam. Such processes cannot be employed to separate the soluble proteins, such as lactalbumin and globulin, from whey in a soluble and essentially undenatured form. It is in this form that the protein has its greatest utility for incorporation into food products.

SUMMARY OF THE INVENTION

It has been found that with suitable equipment, foam fractionation can be employed to separate and recover the soluble proteins from whey. Air introduced as small bubbles into a pool of cheese whey, soy whey, or other protein containing solutions, develops a layer of foam above the liquid. Surface tension of the pool liquid is altered by protein collected at the air - liquid interface which stabilizes the foam. If air is introduced continuously and the foam produced is confined in a column long enough to allow the liquid to drain sufficiently, the foam issuing from the column then contains a higher concentration of protein than the original whey. The foam can be broken and rerun through several additional stages of foaming to further concentrate the protein. Control of the temperature at 95° to 120°F. is critical to the generation and stability of foam from cheese whey. If lower temperatures are desired, carboxymethyl cellulose (CMC) or other agents can be used however, the resulting product will contain the CMC or other agent, producing a less desirable material.

The apparatus for conducting the process of the present invention generally comprises an elongated column but preferably comprises a long, narrow, high-sided box with an air sparger running the length of the bottom of the box. The whey feed is introduced at a constant rate into one end of the box at a controlled temperature, and is continuously and repeatedly sparged with air as it travels toward the other end of the box. Exhausted liquid is removed at the opposite end and foam is removed from across the length of the top of the box. Feed is introduced through a tube reaching to the bottom of the trough at one end and temperature is controlled by use of a heater formed of tubing the length of the box, through which temperature controlled hot water is circulated. Sparging is accomplished by use of a heavy walled tubing running the length of the box, sealed at one end and having orifices therein for release of the air in bubbles of controlled diameter.

The major problem solved by the process of the present invention is the low cost recovery of whey protein on a wider range of scale of operation than previously possible. Existing processes, such as electrodialysis, ultrafiltration, reverse osmosis, gel filtration, require much higher capital investments and require higher energy consumption to fractionate the whey. The economics thus restrict their use to large scale operations. This in turn calls for shipment of whey from small plants to central processing points or alternatively, concentration of the whey. Economics restrict the distance that the whey can be shipped. Since the whey contains so little solids, the cost of the resulting product is generally too high to recover, unless the plant processes huge quantities of whey obviating the necessity of hauling or drying. The herein described process also presents a viable answer to the current industry wide problem of disposal and utilization of whey solids. The over-riding need at present, is to dispose of whey in such a way as to avoid contamination of the environment. While the described process removes only the protein and part of the lactose from the whey, the biological oxygen demand value of the discarded product is greatly reduced. Concurrently, the low fat and ash content of the resultant protein product presents a product which is attractive to many food malufacturers and processors. The process also overcomes some of the problems experienced in the membrane separation processes such as costly filtration elements, microbiological fowling, low flux rates and the like.

The invention will be better understood with reference to the following description.

DRAWINGS

FIG. 5 is a box type vessel for conducting foam fractionation, positioned at an angle to the vertical;

FIG. 6 is a flow diagram of a four-stage foam fractionation system without recycle illustrating the purification of protein obtained from each stage; and FIG. 7 is a chart illustrating the effect of liquid drainage from the foam.

DETAILED DESCRIPTION

Figure 2:
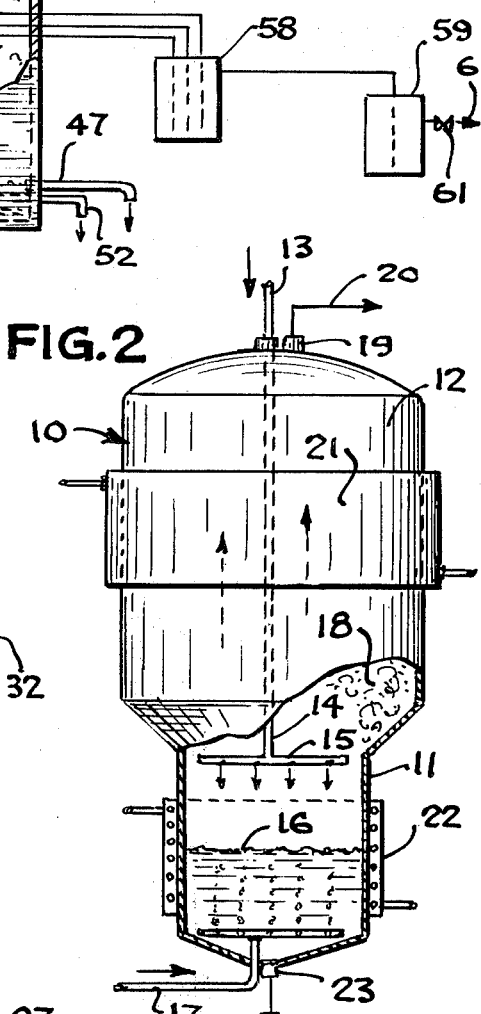
FIG. 2 is a side elevational view, partially in cross section, of a column type vessel for conducting foam fractionation.

The process of the present invention can be conducted in a suitable vessel, FIG. 2 illustrating a column type vessel 10. This represents a single stage. Several columns would be used in succession, passing unders to the preceding stage and overs to the next successive stage. To provide adequate drain time for the liquid in the foam without the requirement for a column 10 of excessive height, the column 10 includes two portions of differing diameter, a lower portion 11 of smaller diameter and an upper portion 12 of larger diameter. The assembled column 10 allows continuous introduction of liquid at any height, with continuous removal of foam independent of the feed inlet 13 and continuous removal of fluid from the bottom. Gas for foam development is introduced through a sparger tube. The air delivery rate can be limited by a regulating valve.

The liquid whey feed is introduced into the column 10 through a feed inlet 13 in the upper portion 12. The feed is distributed through a conduit 14, preferably having a header 15 for even distribution of the feed. The liquid feed is allowed to form a pool 16 in the lower portion 11 of the column 10 with air being thereafter fed into the liquid pool 16 through a sparger tube 17. As foam 18 is formed, it will rise through the upper portion 12 of the column 10 to an outlet 19 where it can be drawn off by means of a vacuum. The foam 18 can then be directed through a suitable conduit 20 to a condenser or collector (not shown) for further processing or to a second stage column. As the foam 18 rises in the column 10, liquid in the foam 18 will drain down the column 10, back into the liquid pool 16. The temperature of the liquid pool 16 and foam 18 can be controlled by heat jackets 21, 22 disposed about the upper 12 and lower 11 portions of the column 10, or other suitable heating means, while the liquid can be removed through a drain 23 in the lower portion 11 of the column 10.

Figure 3:
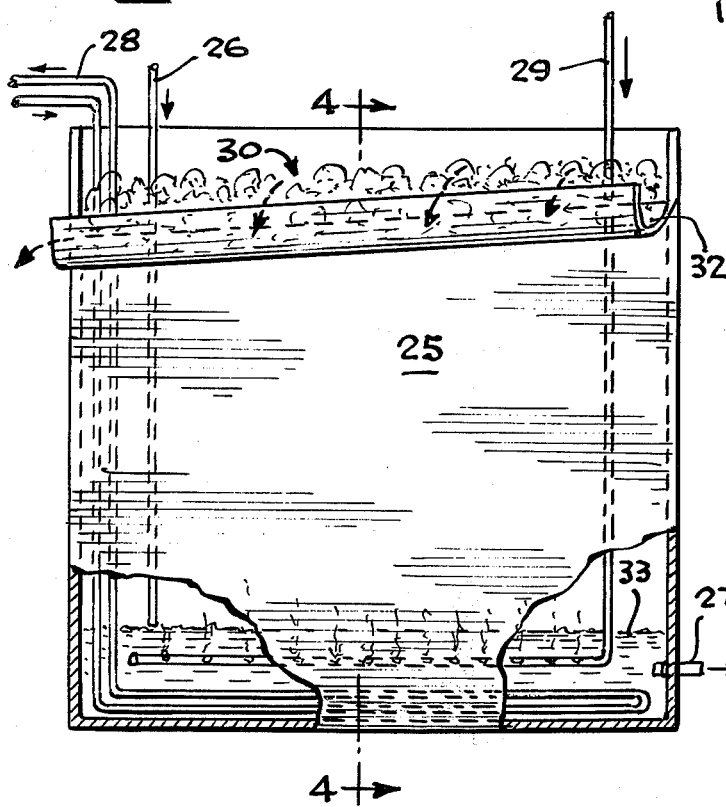
FIG. 3 is a side elevational view of a box type vessel for conducting foam fractionation.
Figure 4:
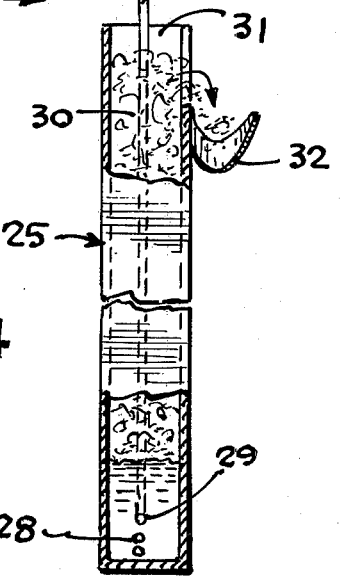
FIG. 4 is a sectional view as seen along the line 4—4 of FIG. 3.

Other suitable vessels for conducting the process are illustrated in FIGS. 1, 3, 4 and 5 and generally comprise a rectangular box. The process described herein was conducted in a box 25 approximately 4 feet long, 28 inches high, with the parallel walls set approximately 4 inches apart as best seen in FIGS. 3 and 4. Stainless steel tubing is used to provide, (1) a liquid feed inlet 26 and liquid feed discharger 27, (2) a heater tube 28, and (3) a sparger tube 29. Foam 30 developed by bubbles from the sparger tube 29 moves through the box 25 to the top opening 31 where it enters a trough 32, is removed and carried to a collector where any remaining foam is broken and collected, the liquid feed being pumped to the system. Temperature of the pool of liquid 33 is regulated by adjusting the flow of circulating hot water through the heater tube 28 and measured by the temperature of the outflowing liquid. The pool 33 depth in the vessel 25 is regulated by the height of the overflow tube outlet 27, the temperature of the liquid pool 33 being measured at the outflow. Withdrawal of the foam 30 is regulated by adjusting the vacuum line valve (not shown).

Figure 1:
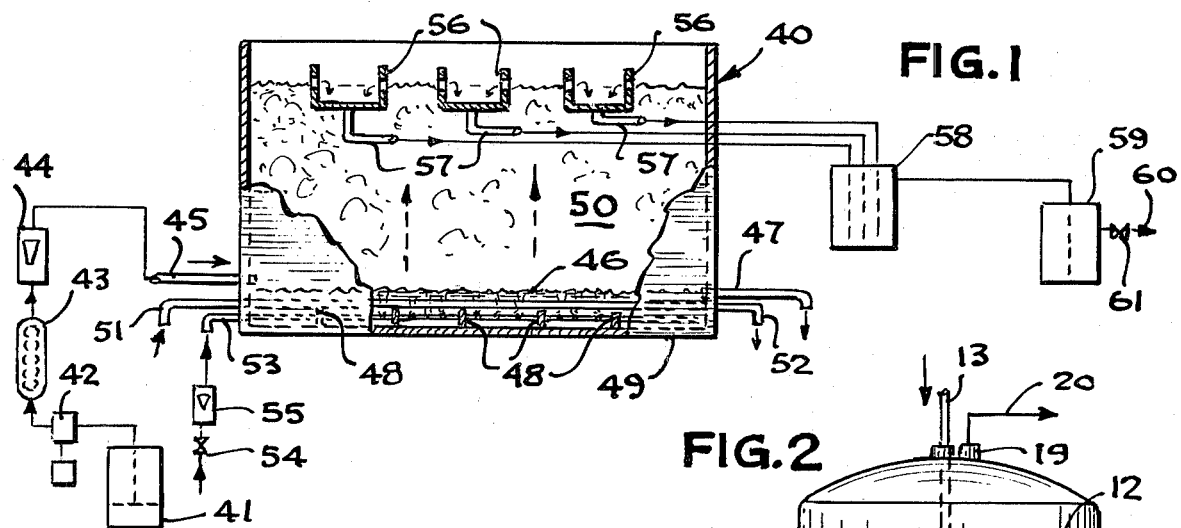
FIG. 1 is a side elevational view, partially in section, of a single stage of the foam fractionating equipment of the present invention, including the whey feed and foam removal portions.

FIG. 1 illustrates a complete foam fractionation equipment in which the vessel for conducting the fractionation comprises a box like structure 40. The whey feed supply is stored in a reservoir 41 and by means of a pump 42 is pumped through a heat exchanger 43 for the purpose of preheating the feed, thence through a rotameter 44 and a inlet 45 into the vessel 40 where a liquid pool 46 of the whey feed is formed. An overflow outlet 47 is disposed in the opposite side of the vessel 40 to control the pool 46 depth. Baffles 48 can be positioned in the bottom 49 of the vessel 40 to assist in providing mixing. To maintain the desired temperature of the liquid pool 46 and foam 50 which is formed, hot water is pumped through tubing 51 which is disposed within the liquid pool 46 and spans the width of the vessel 40, exiting through an outlet 52. To create the foam 50, compressed air is passed through an air sparger tube 53 disposed within the liquid pool 46 across the width thereof. The amount of air fed into the pool 46 can be controlled by adjustment of a control valve 54 in the air line 53, using a rotameter 55 or other suitable measuring device to measure the quantity of air being fed. As the foam 50 is formed and rises upwardly within the vessel 40, it can be removed at the top thereof through weirs or troughs 56 which are connected through suitable tubing 57 to a liquid collector 58. In turn, the liquid collector 58 is connected to a trap 59 in a vacuum line 60. The vacuum and hence foam collection can be controlled by means of an appropriate valve 61.

Fresh untreated raw cottage cheese whey was used as the liquid feed. Either acid or sweet whey can be employed. All of the whey feed and fractions were held refrigerated at 40° when not being processed.

Although the process can be conducted in a single vessel, three or more vessels in a staged operation are preferable. In this case, the bottoms, or underflow product is passed back to the previous column and discarded from the first column only. Overflow product is fed to the next column ahead, except the last stage which yields the concentrated product. If each of the inddividual stages yields approximately 90% recovery of the protein fed as overflow product, then a limit of approximately 70% overall can reasonably be expected for a three stage operation. At the same time, an increase in protein can be expected equal to 2.5 times the original concentration, expressed as a percent of total solids. Expressing protein in this way overcomes the difficulty of comparing streams of different concentration, caused by dilution or fractionation or variable feed analysis, and shows immediately how the protein is increasing in relation to the other components at each stage in the system. Using this method to indicate purification, FIG. 6 shows that a four stage system can achieve at least a two-fold increase in the amount of protein in comparison to raw whey. This increase is at the expense of lactose which is reduced to about 70% of the normal level, and is accompanied by a reduction in the lactic acid of about 20%. The analysis of the resulting product is seen in Table I where it is compared with an average analysis for acid whey solids, and three commercially available concentrated whey protein products. Samples A, B, C are presented as representative of two different whey treatment processes, (1) electrodialysis and ultrafiltration (A, B) and (2) reverse osmosis and gel diffusion (C).

TABLE I

Analysis of Whey Solids & Isolates

|  | Acid Whey Solids | Isolate From Vessel | A | B | C |
|---|---|---|---|---|---|
| Moisture | 4.5 | 4.3 | 3.8 | 3.7 | 3.1 |
| Fat | — | — | 0.7 | 0.7 | 2.0 |
| Protein | 11.3 | 24.1 | 13.9 | 14.1 | 54.2 |
| Ash | 7.5 | 11.1 | 3.8 | 0.9 | 14.0 |
| Lactose | 66.5 | 51.3 | 77.3 | 83.1 | 24.6 |
| Lactic Acid | 10.2 | 8.7 | — | — | — |

In the process of the present invention, both recovery and purification are affected by the amount of foam drainage, as illustrated in FIG. 7. One purpose of using the box design is to provide good drainage in a short length of column. If the box is tilted from a vertical position, as seen in FIG. 5, the drainage path shortens from the maximum, which is the height of the box 25, to the minimum length approaching the box thickness 34. When the box 25 is vertical, all of the liquid must drain down over the rising foam 30 and back into the liquid pool 33. The foam throughput is thus limited. Foam 30 rising at a rate above the limit prevents liquid from draining back and carries most of the liquid out with the foam 30. No separation is accomplished and the result is analogous to flooding in a distillation column. If the box 25 is operated at an angle, the drainage path is shorter and, since the liquid bypasses most of the foam 30, a higher foam 30 flow is possible in comparison to a column of comparable height. With a vertical or zero angle, the box 25 is operated essentially as a column. Any internal coalescence of the foam bubbles approximates a reflux, which provides a higher protein concentration in the overflow and a good recovery. However, purification, recovery, and throughput are limited by column height. With the same box 25 type vessel, the highest protein to total solids produced at this angle was approximately 14% for a single stage, single pass operation. At a 45° angle very considerable coalescence was observed, but without the benefit of reflux since drainage was across the foam 30 layer to the box wall, and had only minimum contact with the rising foam 30. A much higher air-to-liquid ratio was required and the range of operating variables was small. Consequently, although drainage was very good with the vessel 25 operated at 45°, much less separation was achieved than by zero° angle operation. A 22½° angle (as measured from the vertical) operation provided good results. When operated at near optimum combination of variables, 13.2% of protein as a percent of total solids was obtained with approximately 50% recovery for a single pass operation. Higher liquid rates gave lower recovery and lower-protein-to-total solid products.

Another important relationship is the effect of air-to-liquid ratio on purification and recovery. If, for a given liquid feed rate, the air-to-liquid ratio is varied over a practical range, limited by foam instability at the low end and by insignificant drainage at the high end, then protein as a percent of total solids in the overflow goes down as the air-to-liquid ratio increases. However, the effect on recovery is opposite to this, showing increased recovery as the air-to-liquid ratio increases.

To employ the process of the present invention, cheese whey is fed into a suitable vessel such as illustrated in FIGS. 1 through 5. Preferably, the whey is heated to from 160° to 180°F. for a period of 4 to 8 minutes prior to introduction into the vessel with cooling back to 40° F. if the product is to be held for a time prior to foaming. Sufficient whey is introduced to provide initially a pool of whey in the vessel, a pool depth of from 1 to 2 feet being sufficient for a vessel of 4 to 10 feet in height. Preferably, the whey is introduced on a continuous bases above the liquid pool, countercurrent to the rising foam. Air is introduced into the pool of liquid whey at the bottom of the vessel, the air-to-liquid ratio being from about 200 to about 500. Below a ratio of 200, there is no significant drainage of the liquid from the foam and above 500, the liquid tends to be carried up with the foam.

The foam is allowed to form and rise in the vessel from which it can be removed at the top thereof. After removal of the foam from the vessel, the foam is broken and collected. By withdrawing the foam from the top of the vessel through a tubing by means of a vacuum, the foam can be removed and broken at the same time. At this point, the soluble proteins concentrated in the foam can be separated therefrom but preferably, the collected and broken foam is used as a feed for a second stage. Likewise, the foam collected from the second stage can be used as feed for a third stage. Preferably, the foam taken from the second or third stage is diluted 1 to 1 with water before introduction into the last stage.

What is claimed is:

1. A method of separting soluble proteins from a whey liquid containing said proteins employing foam fractionation, said method comprising:
   providing a vessel for retaining said whey liquid;
   preheating said whey liquid at a temperature from about 160° F. to about 180° F.;
   introducing the liquid into the vessel to provide a pool thereof in the bottom of the vessel;
   maintaining the temperature of said whey liquid in the range of about 95° F. to about 120° F.;
   introducing air into said pool to form a foam;
   allowing the foam to rise within said vessel;
   maintaining the height of the foam at least about 2 feet above the liquid pool;
   removing the foam containing the soluble protein from the top of said vessel;
   said foam being removed from the whey liquid in said vessel without precipitation and acid addition to the whey liquid.

2. The method of claim 1 wherein the step of preheating the liquid is effected for a period of from 4 to 8 minutes immediately prior to introduction of the liquid into said vessel.

3. The method of claim 2 wherein the air to liquid ratio is from about 200 to about 500.

4. The method of claim 3 wherein said vessel is positioned at an angle from the vertical, said angle being from about zero° to about 22½°.

5. The method of claim 1 wherein the foam removed from said vessel is introduced as the feed into a second of such vessels.

* * * * *